No. 732,991. PATENTED JULY 7, 1903.
A. AKESON.
EYEGLASSES OR SPECTACLES.
APPLICATION FILED NOV. 8, 1902.
NO MODEL.

WITNESSES.
Elmer Walker
Olin Hill

INVENTOR.
Anders Akeson.
By Charles T. Hannigan,
Attorney.

No. 732,991. Patented July 7, 1903.

UNITED STATES PATENT OFFICE.

ANDERS AKESON, OF PROVIDENCE, RHODE ISLAND.

EYEGLASSES OR SPECTACLES.

SPECIFICATION forming part of Letters Patent No. 732,991, dated July 7, 1903.

Application filed November 8, 1902. Serial No. 130,611. (No model.)

*To all whom it may concern:*

Be it known that I, ANDERS AKESON, a citizen of the United States, residing in the city and county of Providence and State of Rhode Island, have invented certain new and useful Improvements in Eyeglasses or Spectacles, of which the following is a specification.

The object of my invention is to provide for the fastening to the lenses of eyeglasses and spectacles of the parts necessary to constitute a frame of simple construction and yet entirely efficient and at the same time afford a neat appearance to the article.

Figure 1:
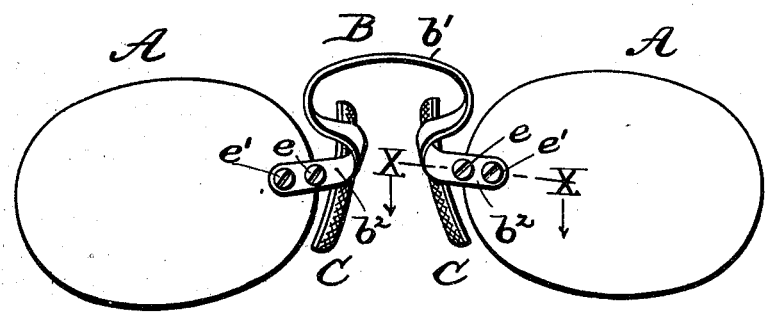
Figure 2:
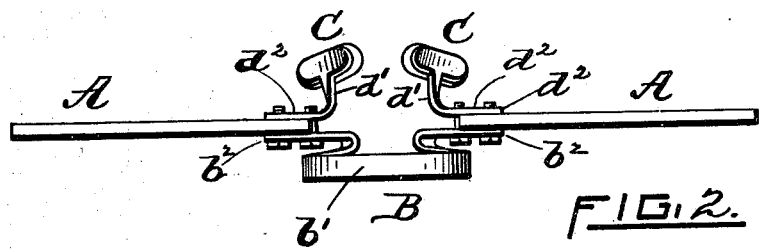
Figure 3:
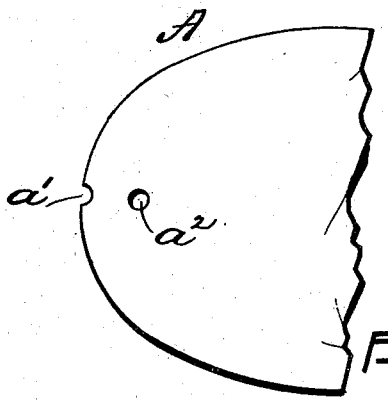
Figure 4:
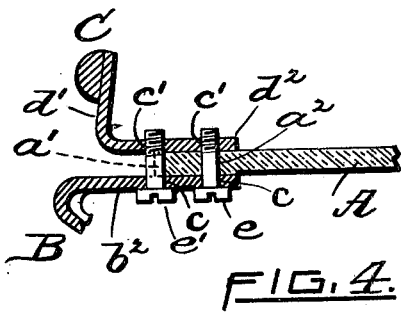

In the drawings, Figure 1 represents a face view of a pair of eyeglasses embodying my invention. Fig. 2 is a top plan view of the same. Fig. 3 is a partial side elevation of one of the lenses, and Fig. 4 is an enlarged cross-sectional view taken in line $x\ x$ of Fig. 1.

Like letters of reference indicate like parts in the several views.

The eyeglasses are provided with the lenses A, each lens having a semicircular notch $a'$ in its edge and a perforation $a^2$ near to said notch, as shown, Fig 3.

B is the bow-spring, bent to shape from a flat metallic strip and having its loop-shaped portion $b'$ extending parallel with and near to the front face of the lenses, and the lower end portions of said spring are bent to a right angle from its loop portion, so to dispose outward-supporting extensions $b^2\ b^2$ to contact upon the front face of the lenses, and each of these extensions is provided with circular openings $c\ c$, that are located to register with the notch and perforation in each lens.

C C are the nose-pieces, each of which has an offset arm, as $d'\ d'$, integral therewith, and bent so to dispose an outward-supporting extension, as $d^2\ d^2$, to contact upon the rear face of each of the lenses, and each of these extensions is provided with screw-threaded openings $c'\ c'$ to register opposite the openings in the extensions of the bow-spring B.

The bow-spring and nose-pieces, as described, constitute a frame that is rigidly secured to the lenses by screws $e$ and $e'$, which pass freely through the openings in the extensions $b^2\ b^2$ of the bow-spring, through the notch and perforation of the lens A, and finally engage in the threaded openings in each of the extensions of the nose-pieces C C in the manner as illustrated in Fig. 4.

Ordinarily the frame of an eyeglass or spectacle is provided with a mounting which requires a single screw for the attachment of the lens at one point only. Hence such lenses work loose and constantly change the positions of their focal points. I overcome this objectionable feature by providing the notch $a'$ in the lens and having the screw $e'$ to fit snugly in said notch, whereby the lens is held immovably on the spring B and nose-piece C of the frame and is not affected by a strain that would fracture a lens with but the usual single point of connection.

It will be readily understood that by my construction of frame and mode of fastening the same to the lenses I have the advantage of dispensing with the usual mounting and fittings, so that an optician is enabled to save time and labor in assembling the parts to form a structure of an eyeglass or spectacle.

Having described my improvement, what I claim, and desire to secure by Letters Patent, is—

In eyeglasses or spectacles, the combination with the lenses, each of which has a semicircular notch in its edge and a perforation close to said notch, a flat bow-spring having its end portions to contact with the front faces of the lenses and each portion of said bow-spring provided with circular openings to register with the notch and perforation in the said lenses, two nose-guards each having its shank to contact with the rear face of the lenses and each portion of said nose-guards provided with circular threaded openings to register with the notch and perforation in the said lenses, and screws passing through the openings of said bow-spring, through the notch and perforation of said lenses and engaging in the threaded openings of said nose-guards to hold said parts rigidly together, in the manner as shown and described.

In testimony whereof I affix my signature in presence of two witnesses.

ANDERS AKESON.

Witnesses:
 ELMER WALKER,
 OLIN HILL.